(12) United States Patent
Gard

(10) Patent No.: US 8,085,187 B2
(45) Date of Patent: Dec. 27, 2011

(54) THROUGH AIR RADAR SENSOR

(75) Inventor: Alan Gard, Warrenville, IL (US)

(73) Assignee: Magnetrol International, Incorporated, Downers Grove, IL (US)

( * ) Notice: Subject to any disclaimer, the term of this patent is extended or adjusted under 35 U.S.C. 154(b) by 374 days.

(21) Appl. No.: 12/321,959

(22) Filed: Jan. 27, 2009

(65) Prior Publication Data
US 2010/0188296 A1 Jul. 29, 2010

(51) Int. Cl.
G01S 13/08 (2006.01)
H04B 1/38 (2006.01)
H04B 1/034 (2006.01)
H04B 1/08 (2006.01)
H01H 47/00 (2006.01)
H02B 5/00 (2006.01)
H05K 5/00 (2006.01)

(52) U.S. Cl. ....... 342/124; 455/90.3; 455/128; 455/347; 361/142; 361/600; 361/679.01; 361/755

(58) Field of Classification Search .................. 342/124; 455/90.3, 128, 947; 361/142, 600, 679.01, 361/755, 807
See application file for complete search history.

(56) References Cited

U.S. PATENT DOCUMENTS

| | | | | |
|---|---|---|---|---|
| 4,219,814 A | * | 8/1980 | Johnson | 342/105 |
| 4,290,067 A | * | 9/1981 | Legille et al. | 342/124 |
| 4,332,374 A | * | 6/1982 | Kremer | 266/99 |
| 5,043,735 A | * | 8/1991 | Mawhinney et al. | 342/124 |
| 6,191,724 B1 | * | 2/2001 | McEwan | 342/21 |
| 6,292,131 B1 | * | 9/2001 | Wilke et al. | 342/124 |
| 6,337,655 B1 | * | 1/2002 | Wilkie et al. | 342/124 |
| 6,414,627 B1 | * | 7/2002 | McEwan | 342/134 |
| 6,538,598 B1 | * | 3/2003 | Wilkie et al. | 342/124 |
| 6,672,155 B2 | * | 1/2004 | Muller et al. | 73/290 V |
| 6,856,142 B2 | * | 2/2005 | Schroth et al. | 324/644 |
| 6,927,734 B2 | * | 8/2005 | Serban et al. | 343/703 |
| 7,088,285 B2 | * | 8/2006 | Smith | 342/124 |
| 7,106,248 B2 | * | 9/2006 | Janitch et al. | 342/124 |
| 7,701,385 B2 | * | 4/2010 | Edvardsson | 342/124 |
| 7,889,120 B2 | * | 2/2011 | Flasza | 342/124 |
| 2003/0201842 A1 | * | 10/2003 | Gard | 333/24 R |
| 2005/0024259 A1 | * | 2/2005 | Berry et al. | 342/124 |

* cited by examiner

Primary Examiner — Thomas Tarcza
Assistant Examiner — Peter Bythrow
(74) Attorney, Agent, or Firm — Wood, Phillips, Katz, Clark & Mortimer

(57) ABSTRACT

There is disclosed a process instrument comprising a housing and an antenna secured to the housing. A process adaptor is associated with the antenna and housing for securing the instrument to a process vessel to define a process seal. A control in the housing generates or receives a high frequency signal. The control comprises an electromagnetic radiating element. A body supports the radiating element in the housing proximate the antenna for rotation at any angular orientation without affecting the process seal.

21 Claims, 4 Drawing Sheets

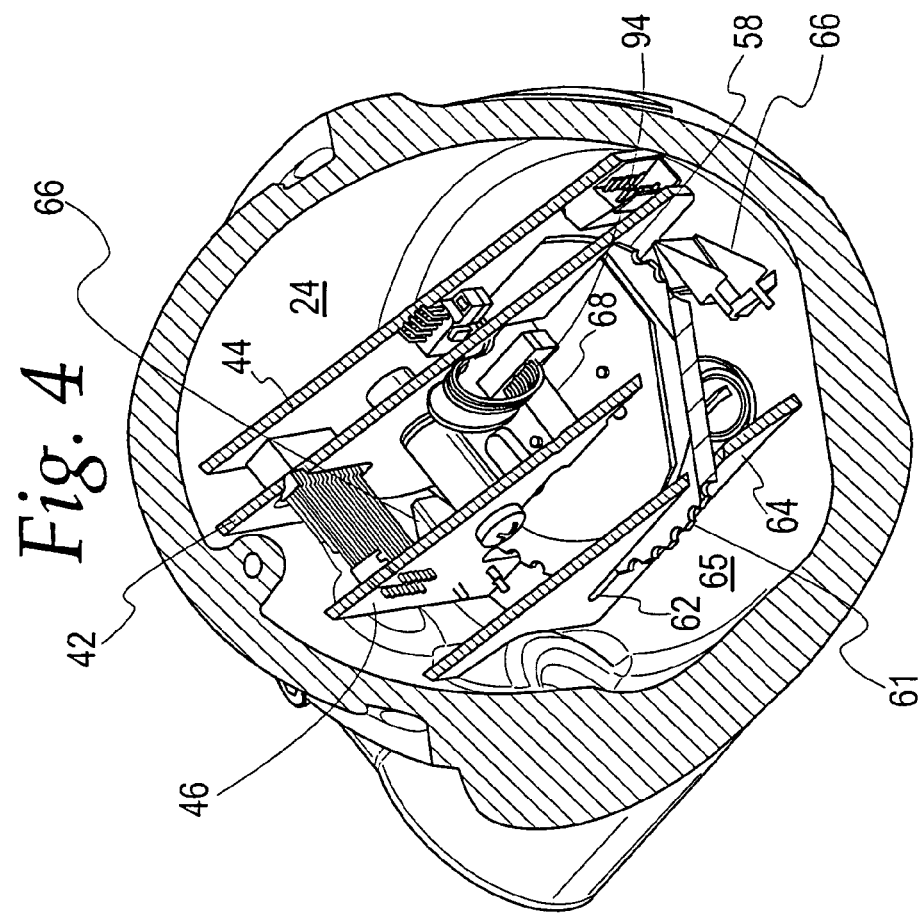
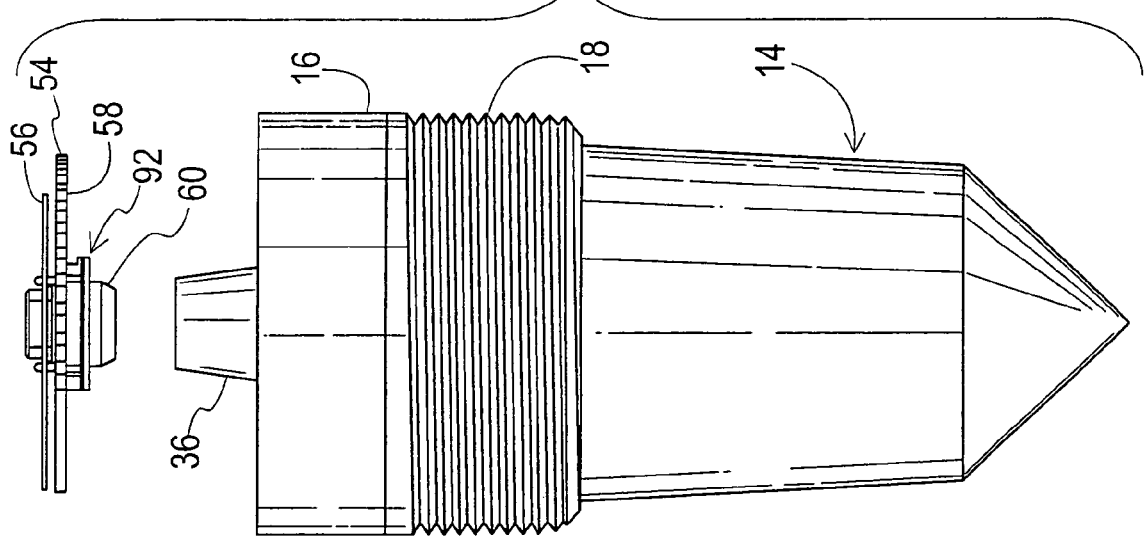

THROUGH AIR RADAR SENSOR

CROSS REFERENCE

There are no related applications.

FIELD OF THE INVENTION

This invention relates to a process control instrument and more particularly, to a through air radar process control instrument, such as a level sensor or rangefinder.

BACKGROUND OF THE INVENTION

Industrial processes often require measuring the level of liquid or other material in a tank. Many technologies are used for level measurement. With contact level measurement some part of the system, such as a probe, must contact the material being measured. With non-contact level measurement the level is measured without contacting the material to be measured. One example is non-contact ultrasound, which uses high-frequency sonic waves to detect level. Another example is use of high-frequency or microwave RF energy. Microwave measurement for level generally uses either pulsed or frequency modulated continuous wave (FMCW) signals to make product level measurements. This method is often referred to as through air radar. Through air radar has the advantage that it is non-contact and relatively insensitive to measurement errors from varying process pressure and temperature. Known radar process control instruments operate at frequency bands of approximately 6 Ghz or 24 Ghz.

A through air radar measurement instrument must convert a high frequency electrical signal to an electromagnetic wave. An oscillator is used to generate the high frequency signal. An antenna, such as a waveguide or horn, is operatively associated with the oscillator. A microwave frequency (26 GHZ, for example) radiation beam is propagated downward from the antenna, and reflected off the surface of the material being measured to the antenna where the signal is received. The product level is calculated from the total time of propagation of the signal.

A difficulty can be encountered when a metal object is located in or around the radiated electromagnetic field. A reflection from a metal object can cause a false target situation, in which the system evaluates the product to be at a level indicated by the reflected signal from the object and not from the actual product. Typical false target objects in tanks are mixers, nozzles, ladders and tank walls. It is well known that the electromagnetic field pattern radiated by a waveguide and/or antenna structure has a characteristic commonly referred to as "polarization". This term refers to the alignment or orientation of the electric and magnetic field components of the radiated wave. A common polarization characteristic is called "linear polarization", in which the radiated electric and magnetic fields are oriented at ninety degrees with respect to each other. Linear polarization is common in many RF systems as most simple antenna structures are known to radiate in this manner. Other forms of polarization exist but they are typically the result of more complex and expensive antenna/circuit structures.

A characteristic of the linearly-polarized radar signals is that orientation of the beam, i.e., orientation of the electric and magnetic fields, will produce a different radar reflection if the object in the beam is not "fully illuminated" by the beam (such as from a large, flat surface). Typical false target objects in a tank are small and asymmetric in the beam (unlike the large, flat liquid surface) and, therefore, orientation of the beam can have a large effect on the susceptibility of the radar to "see" and, therefore be disturbed, by, these smaller unwanted objects.

It is advantageous, therefore, for the radar transmitter to have a convenient form of varying, or rotating, the orientation ("polarization") of the radar beam to minimize the effect of unwanted objects in the radar beam in the actual installation.

An alternative is disclosed in Janitch et al. U.S. Pat. No. 7,106,248, assigned to the assignee of the present application. The instrument described therein utilized a specialized coupling between the housing and antenna to allow independent rotation to achieve optimum orientation of the radar signal. This design requires numerous machined metal parts, O-rings and specially formed electrical components to facilitate independent rotation of the transmission signal relative to the electronics housing.

The present invention is directed to overcoming one or more of the problems discussed above, in a novel and simple manner.

SUMMARY OF THE INVENTION

In accordance with the invention there is provided an improved through air radar process control instrument.

Broadly, in accordance with one aspect of the invention, there is disclosed a process instrument comprising a housing and an antenna secured to the housing. A process adaptor is associated with the antenna and housing for securing the instrument to a process vessel to define a process seal. A control in the housing generates or receives a high frequency signal. The control comprises an electromagnetic radiating element. A body supports the radiating element in the housing proximate the antenna for rotation at any angular orientation without effecting the process seal.

It is a feature of the invention that the body comprises a substrate rotatably mounted in the housing so that the radiating element can be independently oriented relative to the process vessel. The substrate may comprise a circuit board.

It is another feature of the invention to provide a feed bearing attached to the body operatively engaging a feed end of the antenna so that the body is free to rotate in the housing guided by the antenna.

It is an additional feature of the invention to provide a clamping element biasing the body with the feed bearing engaging the antenna.

It is yet another feature of the invention to provide a detent device in the housing operatively engaging the body to maintain the body in a select angular orientation.

It is yet another feature of the invention that the radiating element comprises an oscillator circuit including microstrip resonators.

It is an additional feature of the invention that the antenna comprises a horn antenna.

There is disclosed in accordance with a further aspect of the invention a through air radar sensor comprising a housing and an antenna secured to the housing. A process adaptor is associated with the antenna and housing for securing the sensor to a process vessel to define a process seal. A mounting bracket is secured in the housing. A control circuit in the housing generates or receives a high frequency signal. The control circuit comprises a transceiver circuit board rotationally mounted to the antenna. The transceiver circuit board includes an electromagnetic radiating element. The transceiver board supports the radiating element in the housing proximate the antenna for rotation at any angular orientation without affecting the process seal.

There is disclosed in accordance with a further aspect of the invention a process control instrument comprising a housing and an antenna secured to the housing. Means are associated with the antenna and the housing for securing the instrument to a process vessel to define a process seal. A control in the housing generates or receives a high frequency signal. The control comprises an electromagnetic radiating element. Means are provided for supporting the radiating element in the housing proximate the antenna for rotation at any angular orientation without affecting the process seal.

Further features and advantages of the invention will be readily apparent from the specification and from the drawings.

BRIEF DESCRIPTION OF THE DRAWINGS

FIG. 4 is a partial sectional, perspective view of the process control instrument of FIG. 1, illustrating a rotatable RF transceiver circuit board;

FIG. 5 is an exploded, plan view of an antenna and the RF transceiver circuit board of the process control instrument of FIG. 1.

DETAILED DESCRIPTION OF THE INVENTION

Figure 1:
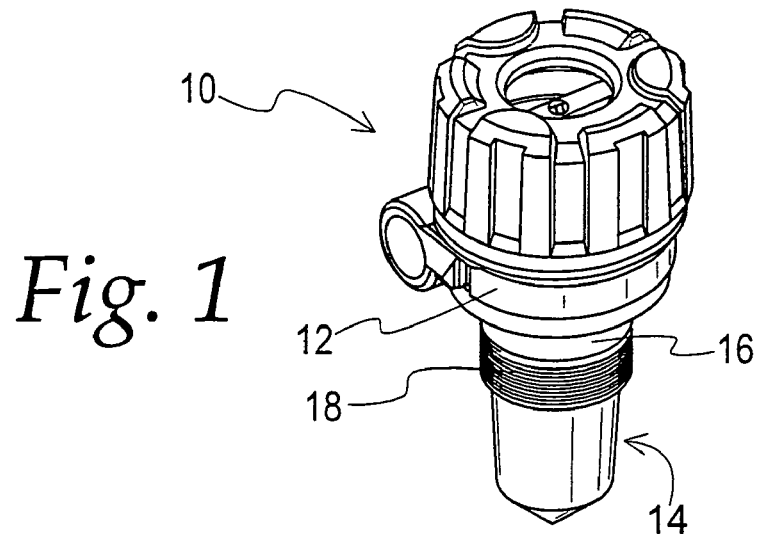
FIG. 1 is a perspective view of a process control instrument in accordance with the invention.

Referring to FIG. 1, a process control instrument 10 according to the invention is illustrated. The process control instrument 10 uses micro power impulse radar (MIR) in conjunction with equivalent time sampling (ETS) and ultra-wideband (UWB) transceivers for measuring a level using time domain reflectometry (TDR). Particularly, the instrument 10 uses through air radar for sensing level. While the embodiments described herein relate to an MIR level sensing apparatus, various aspects of the invention may be used with other types of process control instruments for measuring various process parameters, such as a rangefinder, as will be apparent to those skilled in the art.

Figure 2:
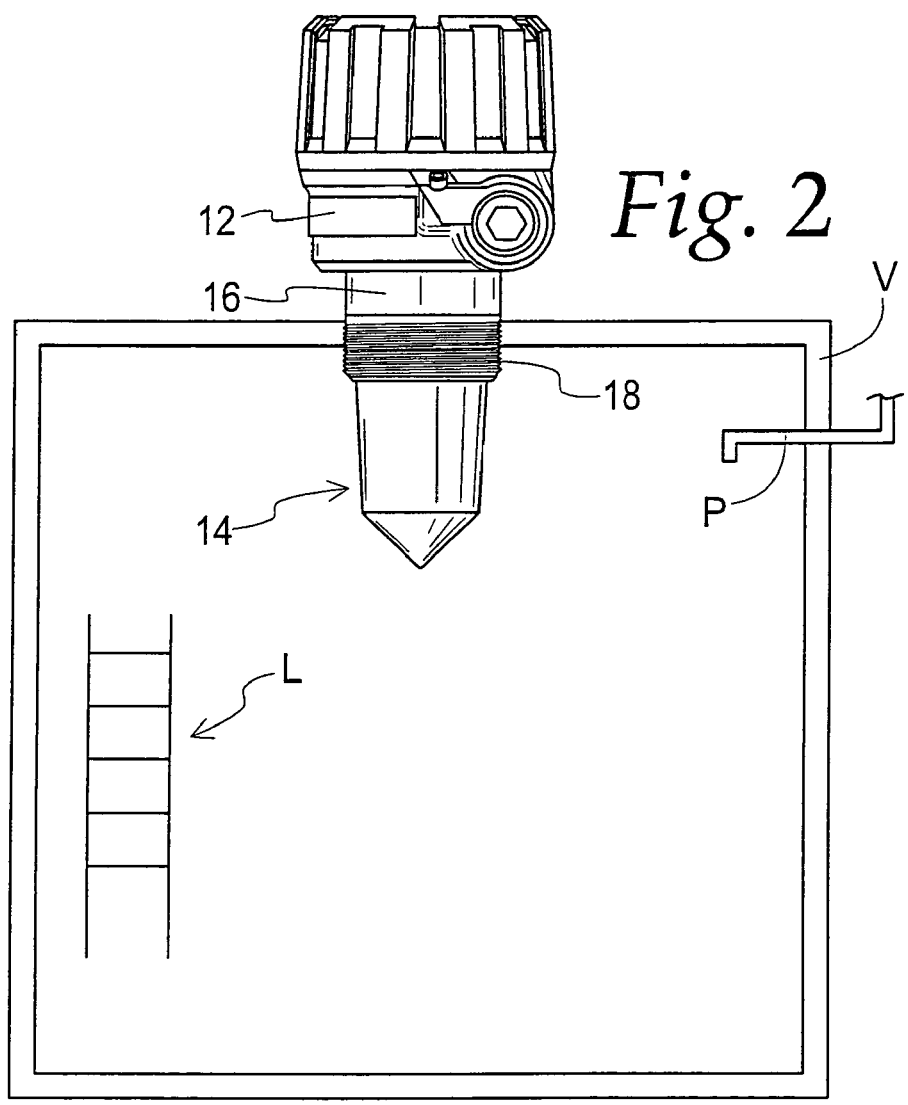
FIG. 2 is an elevation view of the process control instrument of FIG. 1 mounted in a process vessel

The process control instrument 10 includes a control housing 12, an antenna 14, and a process adapter 16 for connecting the antenna 14 to the housing 12. The process adapter 16 is typically mounted to a process vessel V, see also FIG. 2, using a threaded fitting 18. Alternatively, a flange may be used.

The instrument 10 uses pulse-burst radar technology with ETS circuitry. Short bursts of microwave energy are emitted and subsequently reflected from a surface. The distance is calculated by the equation $$D=(\text{velocity of EM propagation})*\text{transit time(round trip)}/2.$$

Level is then calculated by applying a tank height value. ETS is used to measure the high speed, low power electromagnetic (EM) energy. The high speed EM energy (1,000 ft/µs) is difficult to measure over short distances and at the resolutions required in the process control industry. ETS captures the EM signals in real time (nanoseconds) and reconstructs them in equivalent time (milliseconds), which is much easier to measure. ETS is accomplished by scanning the vessel to collect thousands of samples. The round trip event on a 65 ft. tank takes only 133 nanoseconds in real time. After it is reconstructed in equivalent time it measures 200 milliseconds.

Figure 3:
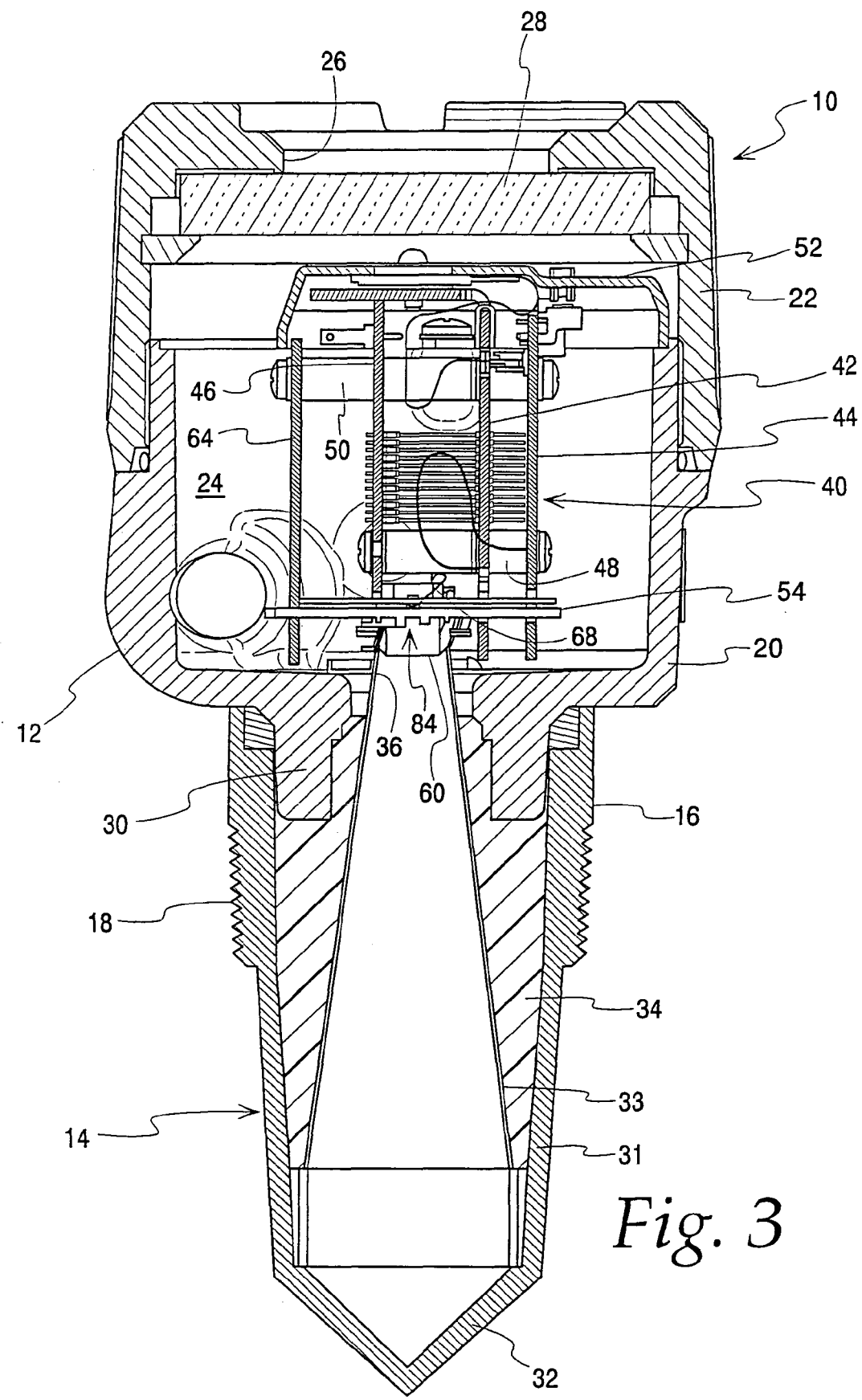
FIG. 3 is a sectional view of the process control instrument of FIG. 1.

Referring particularly to FIG. 3, the housing 12 comprises a base 20 and a cover 22 threaded to the base 20 to define an enclosed space 24. The cover 22 has a top opening 26 closed by a glass plate 28. A bottom of the base 20 includes a downwardly depending neck 30. The neck 30 is receivable in the process adaptor 16. The process adapter 16 is generally cylindrical and connects to an antenna housing 31 narrowing downwardly from the housing 12 to a conical closed end 32. In the illustrated embodiment, the process adapter 16 and antenna housing 31 comprise a unitary structure.

The antenna 14 comprises an antenna horn 33 embedded in potting compound 34 within the antenna housing 31 and process adapter 16. The potting compound 34 also serves to permanently and rigidly attach the process adaptor 16 to the housing base 20. The antenna horn 33 includes an upper feed end 36 that projects into the housing space 24.

A control 40 in the housing space 24 generates or receives a high frequency signal, as described below. The control 40 comprises a mounting bracket 42 fixedly secured to the base 20 in any known manner. First and second main circuit boards 44 and 46 are fixedly secured to the bracket 42 using fasteners 48 and 50, respectively. A bezel 52 is secured in the housing. A rotating RF transceiver circuit assembly 54 is rotationally mounted relative to the fixed mounting bracket 42, and thus antenna horn 33, and is electrically connected to the first main circuit board 44 by a flexible cable 94, see FIG. 4.

Referring also to FIGS. 4 and 5, the rotating transceiver circuit assembly 54 comprises a plate 56 connected to a transceiver circuit board 58. An antenna feed bearing 60 extends downwardly from the transceiver circuit board 58 and is sized to be telescopically received in the antenna horn feed end 36, as shown in FIG. 3. The feed bearing 60, and thus the transceiver circuit board 58, are free to rotate about a vertical axis, guided by the antenna horn 33.

The transceiver circuit board 58 is generally circular and includes a notched outer edge 61. The transceiver circuit board 58 extends through a slot 62 in a shield plate 64. Thus, the notched edge 61 projects through the shield plate 62 into an area 65 of the housing space 24 accessible by a user of the device. The notched edge 61 creates a serrated surface that provides traction for a user's finger or tool to rotate the transceiver circuit board 58.

The notched edge 61 also provides a detent capability for holding the transceiver board 58 in a desired rotational orientation. Particularly, two detent spring clips 66 are mounted to the second main circuit board 46. The spring arms of the clips 66 drop into the notches along the notched edge 61 to detent the transceiver circuit board 58. A hold down spring clip 68 is also mounted to the second printed circuit board 46 to press downwardly on the transceiver circuit board 58 to bias it against the horn antenna feed end 36, as shown in FIG. 3.

The main circuit boards 44 and 46 include electrical circuitry for supplying power to the control 40, and a control circuit to provide measurement functions, display control, configuration, general operation and the like for sensing level and interfacing with other peripherals and control equipment, as is well known to those skilled in the art. The particular circuitry does not form part of the present invention and is not described in detail herein.

The transceiver circuit board 58 contains the necessary circuitry to produce a microwave signal, transmit the signal to a liquid or other surface, receive and process the radar return signal into a so-called "video" wave form from which the locations of the radar echoes can be determined. In the illustrated embodiment of the invention, the main circuitry generates and sends to the transceiver circuit board 58 control signals such as time variable gain, window, run/stop and end of ramp that control the radar scanning process.

Figure 6:
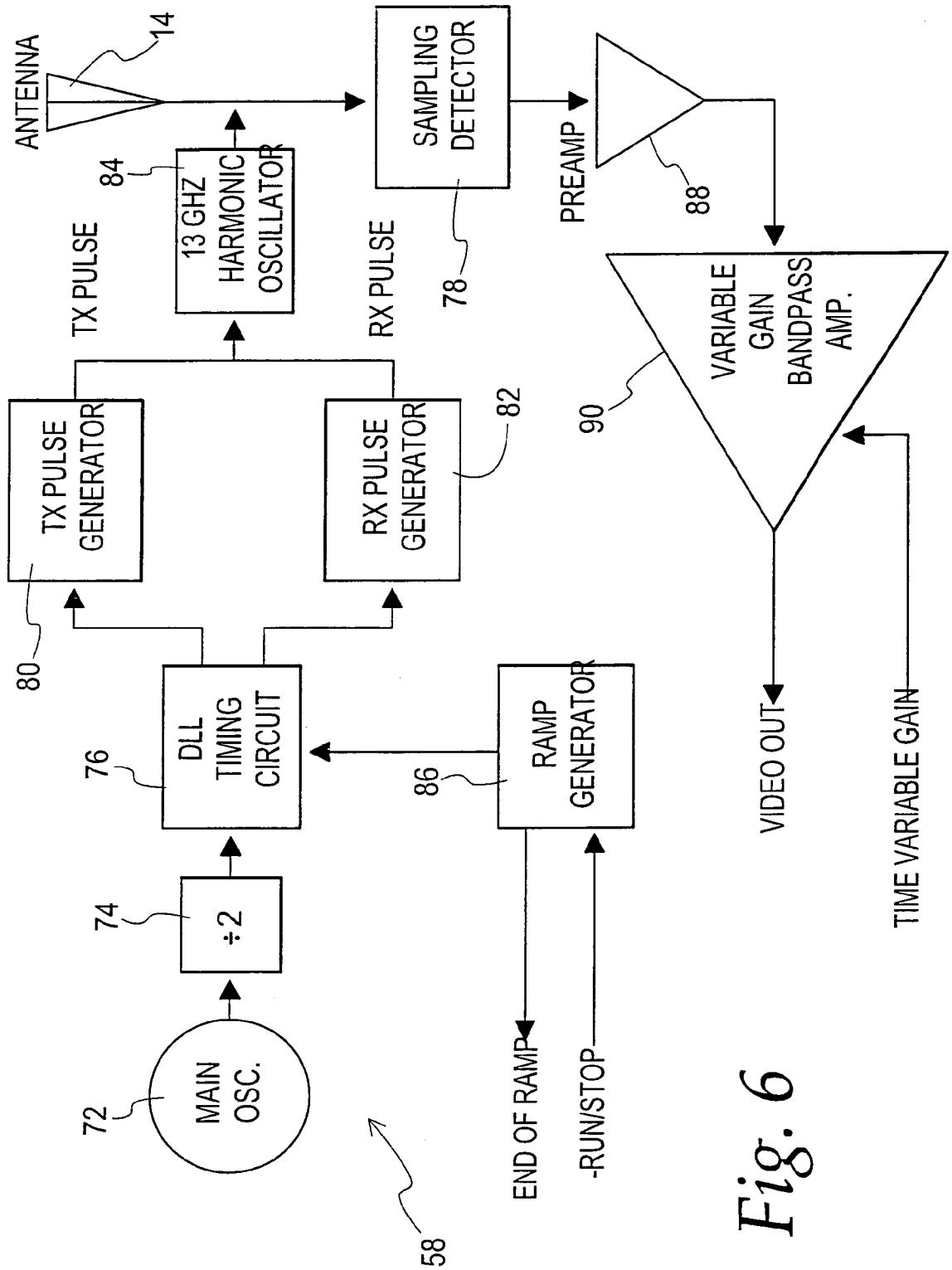
FIG. 6 is a block diagram of a circuit on the RF transceiver circuit board.

A block diagram of the circuit on the transceiver circuit board 58 is illustrated in block diagram form in FIG. 6.

A main oscillator circuit 72 generates a square wave. The main oscillator 72 is a crystal controlled oscillator with a typical frequency in the 3-5 MHz range. In an illustrated embodiment of the invention, the frequency is 3.6864 MHz. A divide-by-two circuit 74 produces a pulse repetition frequency of 1.8432 MHz. This is done to reduce the power requirement in delay locked loop (DLL) logic gates. A DLL timing circuit 76 generates a precise, controlled timing delay between two logic transitions, referred to as transmit, or TX, pulse and receive, or RX, pulse. The transitions are on the order of 0 to approximately 100 nanoseconds, according to the value of a ramp signal input from a ramp generator 86. The delay lock loop in conjunction with a sampling detector 78 performs the function of equivalent time sampling on the transmitted RF signal in accordance with previous, well known designs.

A transmit pulse generator 80 and a receive pulse generator 82 are controlled by the DLL timing circuit 76 and use a single high-frequency switching transistor to generate a very fast, less than one nanosecond, pulse to excite a harmonic oscillator 84. The TX pulse creates the transmit pulse out the antenna 14 towards the radar target, such as a liquid level surface. The RX pulse is delayed from the TX pulse by an amount determined by the ramp generator 86 and the DLL timing circuit 76. The purpose of the RX pulse is to gate the sampling detector 78 and listen for TX pulses which have been reflected by a distant target, and have returned to the antenna 14 after a delay dependent on the target distance.

The harmonic oscillator 84 represents a Colpitts oscillator comprised of a high frequency HJFET and tuned via microstrip resonators to oscillate at approximately 13 GHz while being rich in second harmonic (26 GHz) content. It is primarily the 26 GHz component that is transmitted. This allows the use of smaller antennas which achieve smaller radiated beam widths.

The antenna 14 is not electrically connected to the circuit 58. Instead, the antenna 14 uses an antenna horn 33 that is placed over the oscillator transistor and microstrips of the harmonic oscillator 84, as generally depicted in FIG. 3, whereby the RF energy from the harmonic oscillator 84 is directly coupled into the antenna horn 33 after radiating directly from the circuit elements themselves. As is apparent, a wave guide could also be used with, or instead of, the antenna horn 33.

The sampling detector 78 comprises a microwave diode that is placed inside the antenna horn 33 proximate the harmonic oscillator 84. TX pulses that are reflected by the liquid surface are received by the antenna 14 and conducted to the sampling diode 78 where they are mixed and detected with the delayed RX pulse to perform the equivalent time sampling function. A preamp 88 comprises a fixed gain stage to amplify signal from the sampling detector 78. A variable gain bandpass amplifier 90 comprises a bandpass amplifier tuned to the frequency of the video or down-converted signal which is a result of the equivalent time sampling process. Also, the amplifier 90 provides a variable gain, as controlled by the signal "time variable gain". In radar, since the strength of echoes decreases with increasing distance, a time variable gain circuit is used to increase the gain of the receiver with increasing distance from the transmitter to offset the effect of diminishing radar signal strength with distance.

Thus, the circuitry on the transceiver circuit board 58 operates to generate the transmission signal and the signal is launched directly from the transceiver circuit board 58. By rotating the transceiver circuit board 58, the signal pattern from the harmonic oscillator 84 can be oriented to optimize false target rejection, such as the ladder L and the pipe P in FIG. 2. This allows the assembly of the housing 12 and process adaptor 16 with the antenna 14 to be installed in any rotational direction in the process vessel V simplifying the installation process. Also, the RF signal is generated on the transceiver circuit board 58 directly into the antenna horn 33 without the need of multiple intermediate components. Only a single antenna feed bearing 60 is required along with a sheet metal grounding ring and PTFE washer 92, see FIG. 5. The bearing 60 allows the transceiver circuit board 58 to rotate relative to the housing 12. The three spring clips 66 and 68 are used to hold the transceiver circuit board 58 at the desired rotational position and against the top of the antenna horn 33. Thus, a minimal number of inexpensive parts are required to accomplish the desired rotational orientation.

The ribbon cable 94 comprises a flexible conductor for connecting the transceiver circuit board 58 to the first main circuit board 42.

As described above, the antenna horn 33 is contained within the process adaptor 16 and antenna housing 31 and both are fixed relative to the housing 12 using the epoxy potting compound 34. Use of the potting compound 34 allows for the use of a single process connection with both aluminum and steel housings as well as plastic housings. The potting compound 34 serves to locate and support the antenna horn 33 so that it could be made from relatively thin material, thus lowering costs. Since the process adaptor 16 completely surrounds the antenna horn 33, the antenna horn 33 can be made from a material based on optimal signal propagation rather than on chemical compatibility.

In the illustrated embodiment of the invention, an electromagnetic radiating element comprises the transistor and microstrip resonators of the harmonic oscillator 84. The invention is not limited to such radiating element, but could alternatively use other elements, such as a loop launcher or the like. Moreover, the characteristics of the propagation signal described herein are by way of example only. The invention is not intended to be limited to any particular frequency or wavelength. Instead, the invention is particularly directed to a through air radar sensor having structure rotationally supporting a radiating element within the housing to achieve optimization of launcher position independent of position of the antenna and housing assembly.

Thus, in accordance with the invention, there is provided an improved through air radar level process control instrument.

I claim:

1. A process control instrument comprising:
   a housing;
   an antenna secured to the housing;
   a process adapter associated with the antenna and the housing for securing the instrument to a process vessel to define a process seal;
   a control in the housing for generating or receiving a high frequency signal, the control comprising an electromagnetic radiating element; and
   a body supporting the radiating element in the housing proximate the antenna for rotation at any angular orientation without affecting the process seal.

2. The process control instrument of claim 1 wherein the body comprises a substrate rotatably mounted in the housing so that the radiating element can be independently oriented relative to a process vessel.

3. The process control instrument of claim 2 wherein the substrate comprises a circuit board.

4. The process control instrument of claim 1 further comprising a feed bearing attached to the body operatively engaging a feed end of the antenna so that the body is free to rotate in the housing guided by the antenna.

5. The process control instrument of claim 4 further comprising a clamping element biasing the body with the feed bearing engaging the antenna.

6. The process control instrument of claim 1 further comprising a detent device in the housing operatively engaging the body to maintain the body in a select angular orientation.

7. The process control instrument of claim 1 wherein the radiating element comprises an oscillator circuit including microstrip resonators.

8. The process control instrument of claim 1 wherein the antenna comprises a horn antenna.

9. A through air radar sensor comprising:
a housing;
an antenna secured to the housing;
a process adapter associated with the antenna and the housing for securing the sensor to a process vessel to define a process seal;
a mounting bracket secured in the housing; and
a control circuit in the housing for generating or receiving a high frequency signal, the control circuit comprising a transceiver circuit board rotationally mounted relative to the antenna, the transceiver circuit board including an electromagnetic radiating element, the transceiver board supporting the radiating element in the housing proximate the antenna for rotation at any angular orientation without affecting the process seal.

10. The through air radar sensor of claim 9 wherein the radiating element comprises an oscillator circuit including microstrip resonators.

11. The through air radar sensor of claim 9 further comprising a feed bearing attached to the transceiver circuit board operatively engaging a feed end of the antenna so that the transceiver circuit board is free to rotate in the housing guided by the antenna.

12. The through air radar sensor of claim 9 further comprising a clamping element biasing the transceiver circuit board with the feed bearing engaging the antenna.

13. The through air radar sensor of claim 9 wherein the transceiver circuit board has a notched circular outer edge.

14. The through air radar sensor of claim 13 further comprising a detent device in the housing operatively engaging the transceiver circuit board notched circular outer edge to maintain the body in a select angular orientation.

15. The through air radar sensor of claim 9 wherein the antenna comprises a horn antenna.

16. The through air radar sensor of claim 9 further comprising a shield plate in the housing having a slot receiving an edge of the transceiver circuit board providing an area of the transceiver circuit board accessible by a user to rotate the transceiver circuit board.

17. A process control instrument comprising:
a housing;
an antenna secured to the housing;
means associated with the antenna and the housing for securing the instrument to a process vessel to define a process seal;
a control in the housing for generating or receiving a high frequency signal, the control comprising an electromagnetic radiating element; and
means for supporting the radiating element in the housing proximate the antenna for rotation at any angular orientation without affecting the process seal.

18. The process control instrument of claim 17 wherein the supporting means comprises a circuit board rotatably mounted in the housing so that the radiating element can be independently oriented relative to a process vessel.

19. The process control instrument of claim 17 further comprising a feed bearing attached to the circuit board body operatively engaging a feed end of the antenna so that the body is free to rotate in the housing guided by the antenna.

20. The process control instrument of claim 19 further comprising clamping means in the housing for biasing the circuit board with the feed bearing engaging the antenna.

21. The process control instrument of claim 17 further comprising detent means in the housing for selectively engaging the circuit board to maintain the circuit board in a select angular orientation.

* * * * *